United States Patent
Porte

[11] Patent Number: 6,131,855
[45] Date of Patent: Oct. 17, 2000

[54] DEVICE FOR REMOVING HOT AIR FOR A JET ENGINE AIR INLET COWL WITH A DE-ICING CIRCUIT

[75] Inventor: Alain Porte, Colomiers, France

[73] Assignee: Societe Nationale Industrielle et Aerospatiale, Paris, France

[21] Appl. No.: 09/203,377

[22] Filed: Dec. 2, 1998

[30] Foreign Application Priority Data

Dec. 2, 1997 [FR] France .................................. 97 15136

[51] Int. Cl.⁷ .................................................. B64D 15/00
[52] U.S. Cl. ..................................... 244/134 B; 244/53 B
[58] Field of Search ............................. 244/134 B, 53 B, 244/134 R, 207, 210, 129.4, 129.5; 60/39.091

[56] References Cited

U.S. PATENT DOCUMENTS

| | | | |
|---|---|---|---|
| H648 | 7/1989 | Tran ..................................... | 244/134 B |
| Re. 36,215 | 6/1999 | Rosenthal ............................. | 244/134 B |
| 3,446,223 | 5/1969 | Hancock .............................. | 244/53 B |
| 3,664,612 | 5/1972 | Skidmore et al. .................... | 244/53 B |
| 4,275,857 | 6/1981 | Bergsten .............................. | 244/53 B |
| 4,406,431 | 9/1983 | Heuberger ........................... | 244/53 B |
| 4,482,114 | 11/1984 | Gupta et al. ......................... | 244/134 B |
| 4,757,963 | 7/1988 | Cole ..................................... | 244/134 B |
| 5,257,498 | 11/1993 | Nikkanen et al. ................... | 60/39.093 |
| 5,365,731 | 11/1994 | Nikkanen et al. ................... | 60/39.02 |
| 5,400,984 | 3/1995 | Arnold et al. ....................... | 244/134 B |
| 5,704,207 | 1/1998 | Jensen et al. ........................ | 60/39.091 |
| 5,934,611 | 8/1999 | Tindell et al. ....................... | 244/53 B |

FOREIGN PATENT DOCUMENTS

| | | | |
|---|---|---|---|
| 0205283 | 12/1986 | European Pat. Off. ........... | 244/134 B |
| 0536089 | 4/1993 | European Pat. Off. ........... | 244/134 B |
| 986878 | 3/1965 | United Kingdom ............... | 244/134 B |
| 2259679 | 9/1992 | United Kingdom ............... | 244/134 B |

OTHER PUBLICATIONS

Gillan, M.A., et al., *J. Of Aircraft*, vol. 34, No. 6, (Nov. 1997), pp. 811 to 813.

*Primary Examiner*—Peter M. Poon
*Assistant Examiner*—Fredrick T. French, III
*Attorney, Agent, or Firm*—Fisher, Christen & Sabol

[57] ABSTRACT

The present invention relates to an air inlet cowl (9) for a jet engine. According to the invention, provided in the partition (20) delimiting the de-icing chamber (21) in the hollow leading edge (16) of the cowl is a trough-shaped duct (22) for ejecting to the outside pressurized hot air which has flowed through the chamber (21). The duct (22) is reduced in cross section by a single oblong orifice (18) made, parallel to the leading edge (16), in a part (23) that forms part of the external surface (9E) of the cowl (9).

11 Claims, 6 Drawing Sheets

DEVICE FOR REMOVING HOT AIR FOR A JET ENGINE AIR INLET COWL WITH A DE-ICING CIRCUIT

The present invention relates to the de-icing of air inlet cowls of jet engines, particularly aircraft engines.

It is known that, if need be (to prevent the formation of ice or to remove ice that has already formed), the leading edge of the air inlet cowl of such engines is de-iced by heating with pressurized hot air tapped from said engine and conveyed to said leading edge by a hot air circulation circuit.

To this end, such an air inlet cowl comprises:

a hollow leading edge delimiting an internal peripheral chamber closed by an internal partition (or frame) and equipped with at least one orifice placing said internal chamber in communication with the outside; and a pipe which can be connected, at its rear end away from said leading edge, to said hot air circulation circuit and, at its front end toward the leading edge, to an injector injecting said hot air into said internal chamber.

Thus, the pressurized hot air injected by said injector travels through said internal peripheral chamber, heating it, and is evacuated through said orifice.

There is already known, from document U.S. Pat. No. 5 365 731, an air inlet cowl of this type which comprises a number of such orifices for evacuating the hot air, these being made directly in the leading edge of said cowl, the flow rate of hot air for de-icing being controlled by the cross section of said orifices. Such a known air inlet cowl has the major drawbacks of weakening the leading edge of said cowl (which is the most vulnerable element of an engine nacelle, because it is located at the front and is difficult to repair on account of its large size) and of substantially degrading the aerodynamic performance of said cowl. What happens, as far as the latter drawback is concerned, is that said orifices are located in a shape of leading edge that encourages scooping—and therefore makes it difficult for the hot air to be ejected—and does so throughout all the phases of flight of the aircraft when the de-icing is not in operation. In addition, the ejection orifices produce a substantial ejection area, which generates drag over a large portion of the leading edge, this drag being accentuated by the fact that the surface of the nacelle immediately downstream of this aerodynamically sullied surface is generally itself also highly disrupted which means that it generates additional drag. Furthermore, in such a known air inlet cowl, it is difficult to correct the ejection cross section during flight trials because this cross section is made up of orifices made in a very large part (the leading edge).

Another source, document EP-A-0 205 283 discloses an air inlet cowl in which said pressurized hot air supply pipe is surrounded by an enveloping metal structure comprising piping the free end of which forms the orifice used for ejecting the air for de-icing behind the leading edge of said cowl. This then avoids the aforementioned drawbacks, but in this known device, the hot air flow rate is controlled by the cross section of said ejection piping, and by the orientation of fins arranged at the latter's free end. This gives poor control over the rate of ejection and streams of hot air to the outside. Furthermore, the ejection of hot air is highly concentrated, and this may damage the neighboring structures which are sensitive to heat. In any case, such a device is the source of substantial thermal radiation, which also has the risk of damaging said structures. Finally, the device is expensive because it is made of a great many parts which have to be assembled using joints of limited longevity because they are subjected to high temperatures.

Also known, for example from document GB-A-2 259 679 is an air inlet cowl in which the hot air for de-icing is evacuated to the outside by an elbowed pipe passing through said internal partition to eject the hot air behind said leading edge. Here too, the flow rate of hot air is controlled by the cross section of the pipe and by the orientation of fins arranged therein. This air inlet cowl therefore also has the same drawbacks as those mentioned above with regard to document EP-A-0 205 283.

Finally, document EP-A-0 536 089 discloses an air inlet cowl in which said internal partition is equipped with a trough-shaped duct, directed toward the rear of the leading edge and open toward the periphery of said air inlet cowl. The trough-shaped duct is closed off by a plate pierced with a number of oblong orifices, the direction of which is orthogonal to the leading edge.

By virtue of this arrangement, said orifices, which are used to evacuate to the outside the pressurized hot air which has heated up said leading edge, may be located in that part of said cowl which is located just behind said leading edge. This therefore means that the leading edge, which, from the aerodynamic point of view, is sensitive as far as engine performance is concerned and, from the maintenance point of view, is sensitive because it is exposed to various shocks, is not weakened by said orifices. However, for the reasons mentioned above, such an arrangement does not allow the ejection of the hot air for de-icing to be optimized either aerodynamically or thermally.

The object of the present invention is to overcome these drawbacks.

To this end, according to the invention, the air inlet cowl for a jet engine, especially for an aircraft, said air inlet cowl being equipped with means for de-icing its leading edge and comprising, for this purpose:

a hollow leading edge delimiting an internal peripheral chamber which is closed by an internal partition, said internal partition being equipped with a trough-shaped duct directed toward the rear of said leading edge and open toward the periphery of said air inlet cowl;

a pipe which can be connected, at its rear end away from said leading edge, to a pressurized hot air circuit and, at its front end toward said leading edge, to an injector injecting said pressurized hot air into said internal chamber; and a part made of a material that can withstand high temperatures and forms part of the external surface of said cowl, to the rear of said leading edge, said part closing off said trough-shaped duct and being pierced in such a way as to place said internal chamber in communication with the outside, is noteworthy in that:

said part comprises a single orifice which has an oblong shape and is arranged parallel to said leading edge, said orifice serving to calibrate the jet of hot air ejected by said trough-shaped duct, while at the same time encouraging heat exchange between said jet of ejected hot air and the external ambient air and keeping this jet of hot air away from said cowl; and said part extends longitudinally in said external surface of said cowl to act as a thermal protection for the latter with respect to said jet of ejected hot air.

Thus, said single orifice makes it possible to control the ejection flow rate and also to obtain a favorable heat exchange between the hot air ejected and the external ambient air, while at the same time controlling the divergence of the jet of hot air in order to keep it away from those structures of the nacelle which are temperature-sensitive. It is thus possible to avoid the drawbacks of the orifices of the known de-icing devices which:

when they are in the form of a circular orifice, excessively concentrate the ejection cross section and give rise to a reduced area for exchange between the jet of de-icing air and the ambient external air, the energy of said jet being too high which means that there is a risk that this jet will reach the temperature-sensitive structures and damage them; and when they are diverged into a number of orifices, give rise to aerodynamic drag which is prejudicial to the aircraft performance, even when the de-icing circuit is not in operation.

It will additionally be noted that in the cowl in accordance with the present invention, said single orifice may be far enough forward on said cowl for there to be no risk of the hot air it ejects damaging those structures of the engine nacelle which are sensitive to heat, such as, for example, cowlings made of composite material.

The leading edge is therefore uniform over all 360° of its circumference, without protrusions or ventilation orifices, and this preserves its aerodynamic qualities and mechanical strength.

Said single oblong orifice may have a number of shapes. For example, it may be of at least approximately rectangular shape, its front and rear longitudinal edges being straight and parallel to said leading edge.

To prevent any lateral widening of said jet of ejected hot air as it leaves said single oblong orifice, as this would leave open the possibility that said jet may sweep over—and therefore damage—the external surface of the cowl outside and to the side of said part that can withstand high temperatures, it is advantageous that the rear longitudinal edge of said single oblong orifice be concave, to give said orifice a width which is greater mid-way along its length than it is at its ends. Thus, the flow rate of hot air ejected through said orifice is greater near the center of said part and lower at its periphery so that, while encouraging heat exchange between the jet of ejected hot air and the external ambient air, said hot air is concentrated into the central region of said part, preventing thermal damage to those parts of the external surface of the cowl that are situated to the side of said part. In a preferred embodiment of this type, the front longitudinal edge of said single oblong orifice is straight and parallel to said leading edge, while said concave rear longitudinal edge of said orifice is curved.

To gain yet further control over the divergence of the jet of ejected hot air, said single oblong orifice may comprise turbulence generators, for example consisting of teeth or roughnesses located at the periphery of said orifice. These turbulence generators may be borne by at least one of the front or rear longitudinal edges of said single oblong orifice. They may be achieved by cutting the edges of said orifice in said part that can withstand the high temperatures or by one or more parts attached around the periphery of said orifice. Said turbulence generators may be located in the surface of said thermally resistant part, or alternatively may project therefrom, for example, by bending said trough-shaped duct inward.

To prevent the jet of ejected hot air from spreading out sideways as was already mentioned above, it is therefore possible to make at least the turbulence generators—for example the teeth—which are near the ends of said orifice turn the lateral parts of said jet of ejected hot air toward the center of said thermally resistant part.

As a preference, said trough-shaped duct is peripherally close to said pipe that conveys the pressurized hot air. Thus, said hot air travels around the entire circumference of said leading edge, and a very uniform distribution of said hot air inside the latter, and therefore good de-icing performance are obtained. In addition, such positioning means that said part in which said orifice is made can, by its size, be made to protect the regions in contact with the hot air removed through said orifice. Said part may additionally form the door for inspecting said pipe for conveying hot air. In this way it is possible to benefit from the compulsory presence, for accessing the de-icing air pipework, of a removable panel that can withstand high temperatures situated immediately to the rear of said ejection orifice. Such a door may extend longitudinally in the external surface of the cowl over a sufficient length to protect all of that part of this surface that may be subjected to the action of the flow of hot air ejected by said orifice. Furthermore, by providing several removable panels equipped with different ejection orifices, said orifice can easily be replaced and different ejection cross sections tested.

Furthermore, it is advantageous for said trough-shaped duct to widen in the direction of the external periphery of said cowl. Thus, it may have an aerodynamic shape that encourages the ejection of air.

Said trough-shaped duct may form an integral part of said internal partition and, for example, be produced by pressing this partition. It may also consist of a part attached to said internal partition, in a recess thereof.

The figures of the appended drawing will make it easy to understand how the invention may be achieved. In these figures, identical references denote similar elements.

Figure 1:
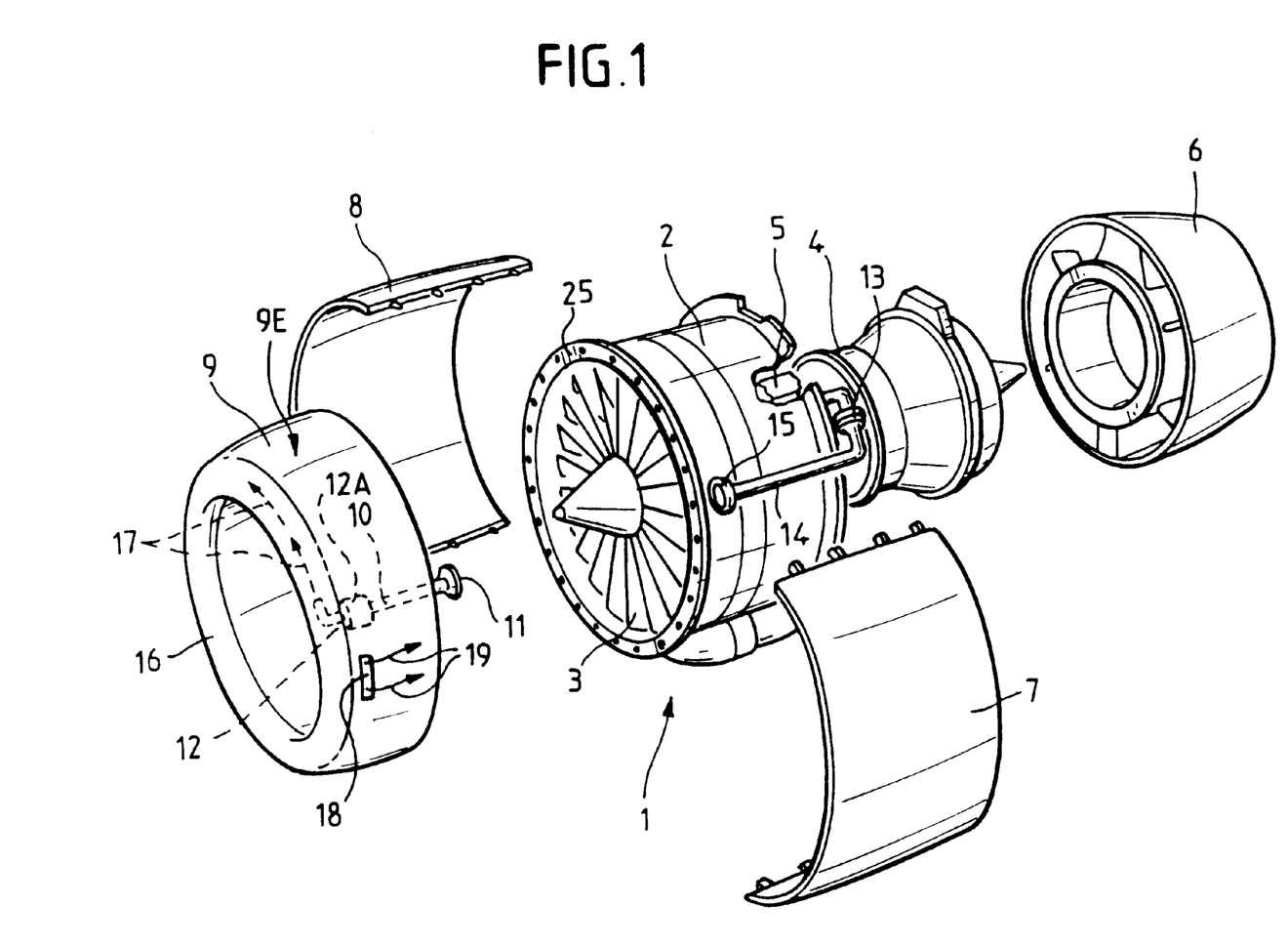
FIG. 1 shows, in exploded perspective, an aircraft jet engine and its various cowlings.

The bypass engine 1 depicted diagrammatically in FIG. 1 comprises, in a known way, a central hot air generator 2, a fan 3 and compressor stages 4 and is equipped with a hanger 5 for hanging it from a support mast (not depicted). Associated with and fixed to the engine 1 are a jetpipe assembly 6, two lateral cowls 7 and 8 and an air inlet cowl 9.

As is illustrated diagrammatically in FIG. 1, the air inlet cowl 9 comprises an internal pipe 10 provided, at its rear end that faces toward the engine 1, with a connector element 11 and, at its front end housed in the hollow leading edge 16 of said air inlet cowl, with an injector 12 equipped with a connector 12A. Furthermore, arranged on a compressor stage of the engine 1 is a pressurized hot air tapping 13 which is connected to a pipe 14 equipped, facing the connector element 11 of the pipe 10, with a complementary connector element 15.

Thus, when the complementary connector elements 11 and 15 are connected together, hot air (for example at a temperature of 400° C.) tapped at 13 from the engine 1 is conveyed via the pipes 14 and 10 as far as the injector 12. The latter can therefore blow this pressurized hot air (broken-line arrows 17) inside the leading edge 16 in order to de-ice it. A single oblong orifice 18 is made in the external surface 9E of the cowl 9 for discharging to the open air (arrows 19) hot air which has flowed inside the leading edge 16 (and therefore, for example, at a temperature of 200° C.

As shown in detail and to a larger scale in FIGS. 2, 3, 4, 5 and 10, the hollow leading edge 16 is closed at the rear by an internal partition 20, which means that an annular peripheral chamber 21 is formed inside said leading edge 16. The injector 12 injects pressurized hot air into the chamber 21 and the single oblong orifice 18 places said chamber 21 in communication with the outside.

The internal partition 20 is equipped with a trough-shaped duct 22 turned toward and widening toward the rear of said leading edge 16, that is to say on the actual cowl 9 side, and open toward the periphery of said air inlet cowl 9. The duct 22 may be produced by indenting said internal partition 21, for example by pressing, or may alternatively consist of a part attached to said partition 20.

The single oblong orifice 18 is made in a part 23 which forms part of the external surface 9E of the cowl 9, to the rear of the leading edge 16, and faces the duct 22, limiting the cross section thereof.

Thus, the hot air 19 which has heated up the leading edge 16 is conveyed by the duct 22 to the orifice 18 which discharges it to the outside, controlling its flow rate.

Figure 2:
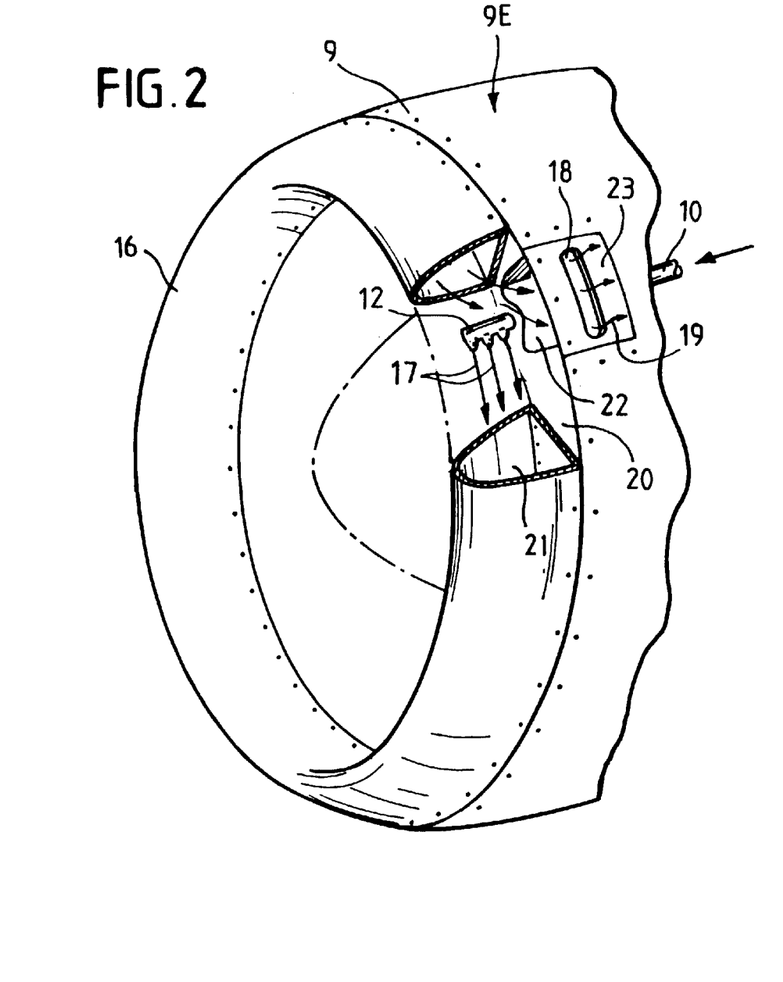
FIGS. 2 and 3 are partial perspective views from the front, with cutaway, of two embodiments of the air inlet cowl in accordance with the present invention.
Figure 3:
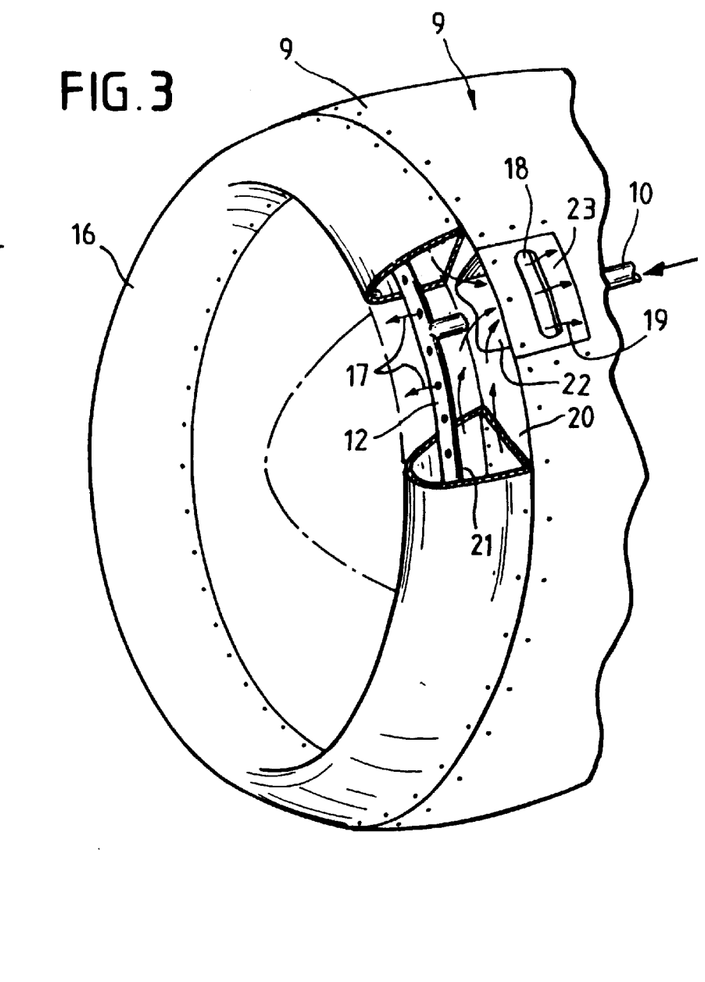
Figure 4:
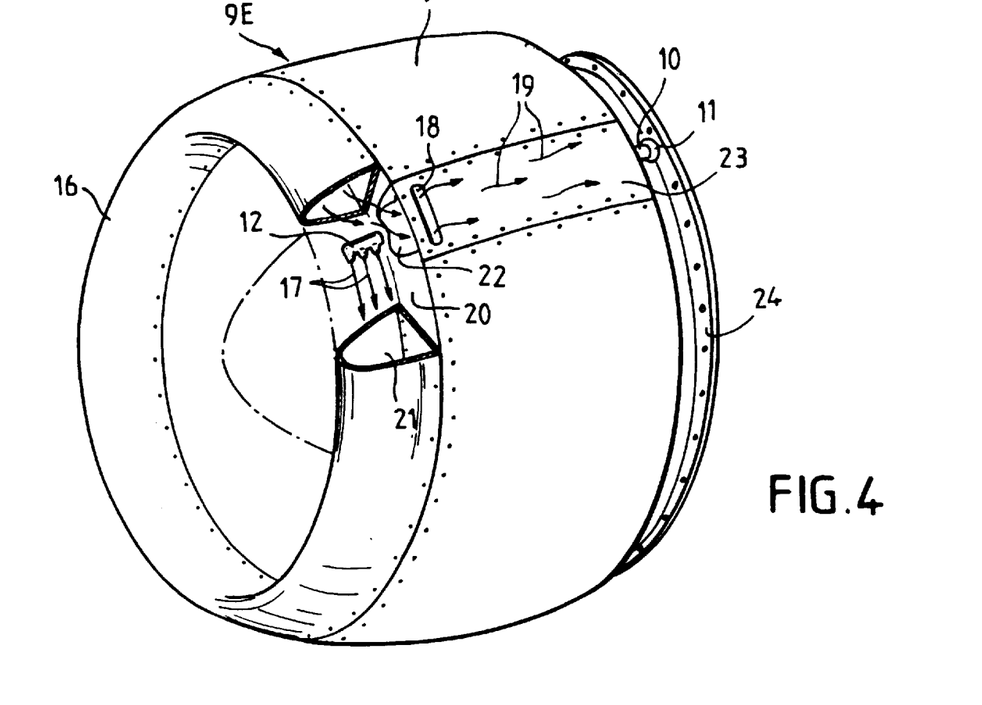
FIG. 4 is a perspective view from the front, with cutaway, of one embodiment of the air inlet cowl in accordance with the present invention.

FIGS. 2 and 3 show that the injector 12 may be of any kind: for example, it may have multiple nozzles (FIG. 2) or consist of a pierced ring (FIG. 3). They also show, as do FIGS. 4 and 5, that the duct 22 is peripherally near the pipe 10. Thus, although the part 23 may be specially designed to close off the duct 22 (see FIGS. 2 and 3), it may advantageously constitute the door provided in the cowl 9 for inspecting the pipe 10, as is shown in FIG. 4. In both instances, the part 23 is made of a fire- and heat-resistant material, for example a metallic substance. The part 23 may extend over the entire length of the cowl 9. In FIG. 4, the flange 24 capable of interacting with the front flange 25 of the engine for attaching said air inlet cowl 9 thereto has been depicted.

The orifice 18 is longer than it is wide and its length is parallel to the leading edge 16 of the cowl 9.

Figure 5:
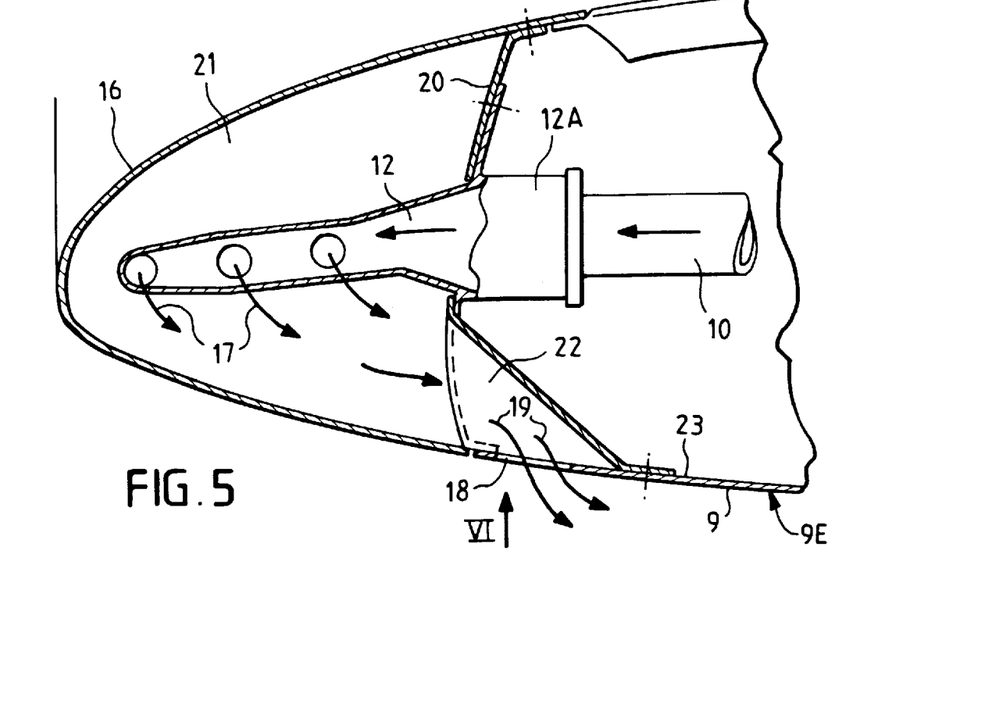
FIG. 5 is a diagrammatic and partial half section of the front part of an air inlet cowl in accordance with the present invention.
Figure 6:
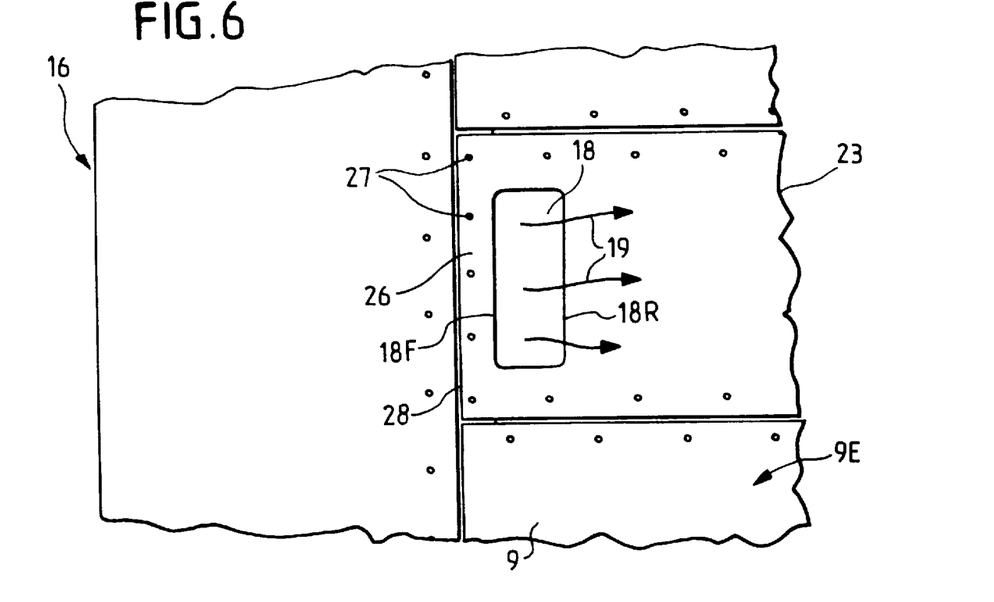
FIG. 6 is a partial view in the direction of arrow VI of FIG. 5.

In the embodiment of FIGS. 5 and 6, the orifice 18 has an approximately rectangular closed contour, its front 18F and rear 18R longitudinal edges being parallel to said leading edge 16. On the leading edge side, the orifice 18 is bounded by a lateral strip 26 of material of said part 23, which lies between said front longitudinal edge 18F of the orifice 18 and the free front edge 28 of the part 23. This part can therefore be fixed to the partition 20 by rivets or the like 27.

Figure 7:
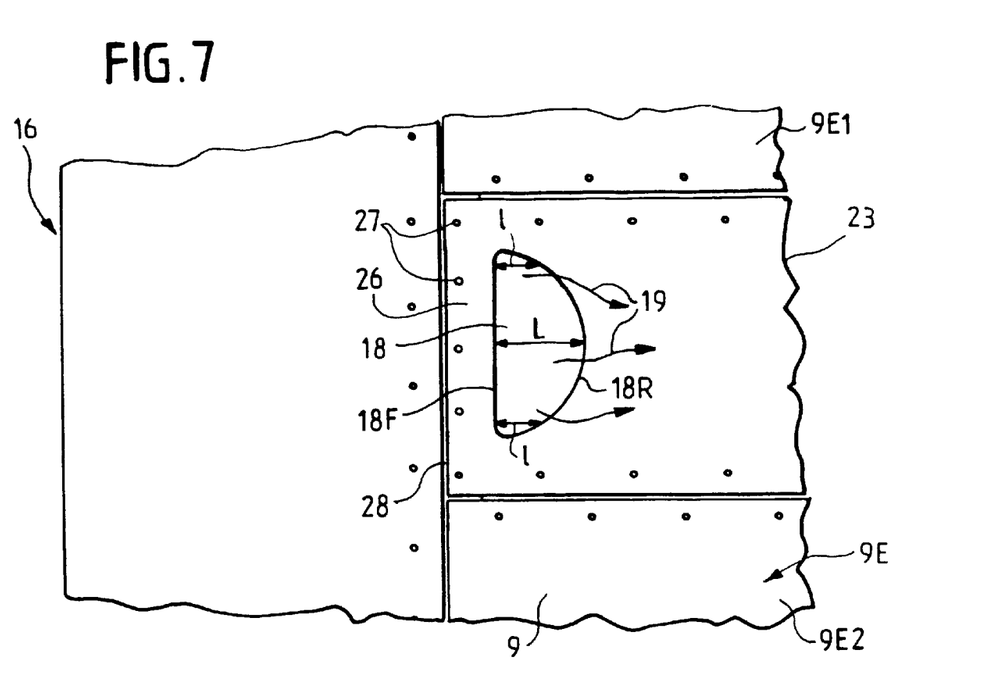
FIG. 7 is a view similar to FIG. 6, illustrating an advantageous embodiment of the single ejection orifice.

In the alternative embodiment of FIG. 7, the front longitudinal edge 18F of the single oblong orifice 18 is also straight and parallel to said leading edge 16 but, by contrast, the rear longitudinal edge 18R of said orifice is curved and concave, so that the width L of said orifice about mid-way along its length is greater than the width 1 near the ends of said oblong orifice 18. Thus, at the center of said orifice, the flow rate of ejected hot air is greater than it is at the ends of said orifice, which means that the hot air is mainly directed toward the central region of the part 23, preventing said jet of ejected hot air from spreading out sideways. This jet cannot therefore reach those parts 9E1 and 9E2 of the external surface 9E of the cowl 9 which are located to the side of the part 23. Thus, any thermal damage to said parts 9E1 and 9E2 by said jet of hot air is prevented.

Figure 8:
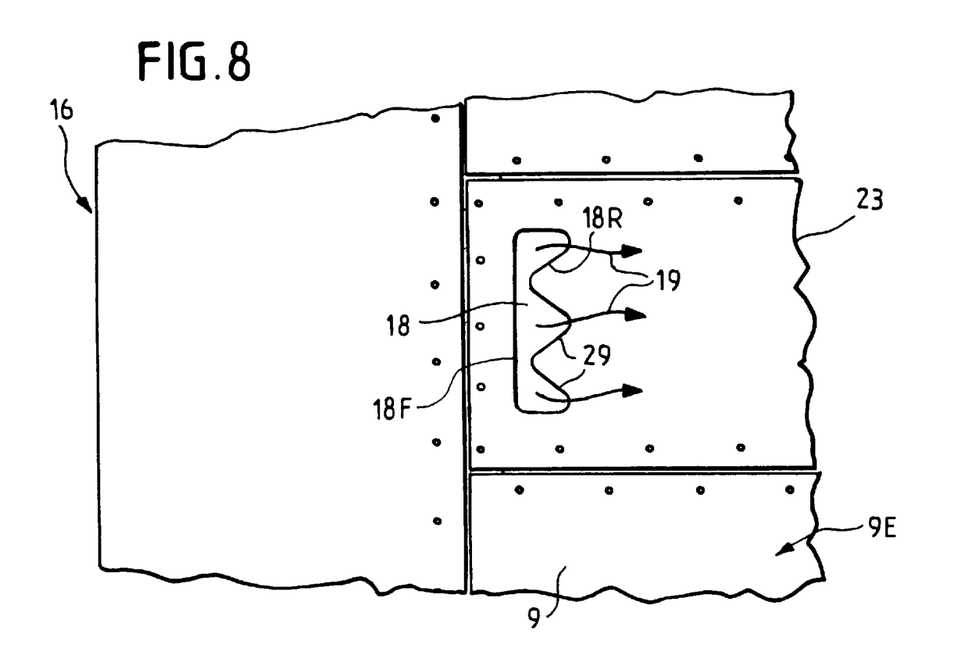
FIGS. 8 and 9 show, in views similar to FIGS. 6 and 7, some alternative forms of the single ejection orifice.
Figure 9:
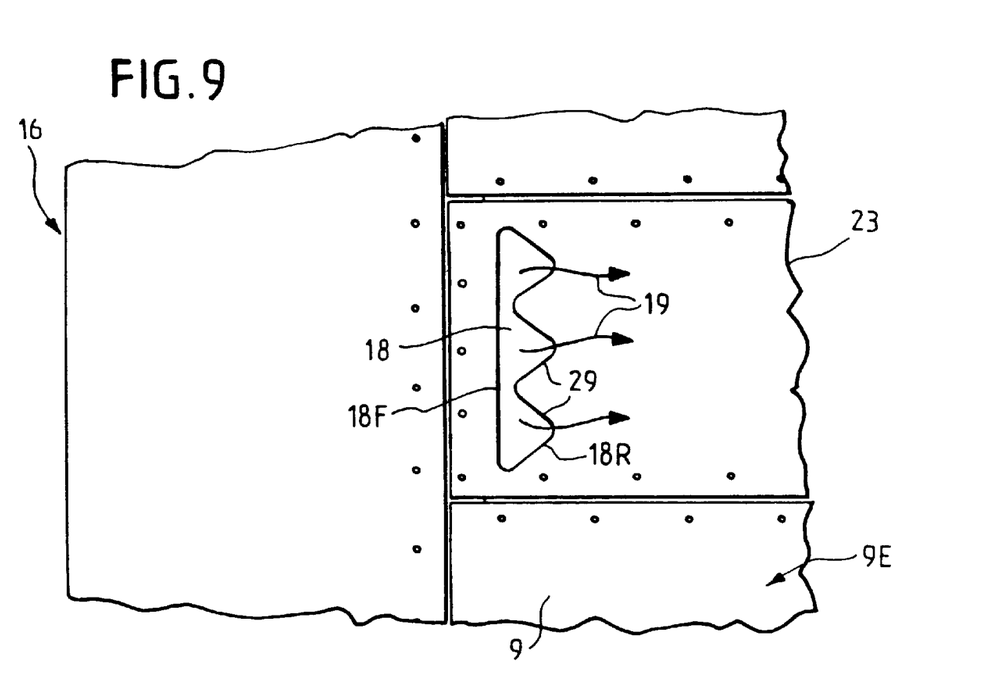

In the embodiments of FIGS. 8 and 9, the orifice 18 has roughnesses or teeth 29 in its contour, to generate turbulence in the jet of ejected hot air. Heat exchange of this hot air with the external ambient air is thus encouraged. Although in these figures said teeth 29 are borne by the rear longitudinal edge 18R of said orifice, it goes without saying that the front longitudinal edge 18F may also bear some, either on their own or in combination with those of said rear longitudinal edge 18R. As is particularly the case in the embodiment of FIG. 9, it is advantageous that said teeth 29, mainly those which are at the ends of said orifice 18, should turn the lateral parts of said jet of ejected hot air back toward the center of the part 23 in order to obtain the same beneficial effect as is afforded by the embodiment of FIG. 7.

Figure 10:
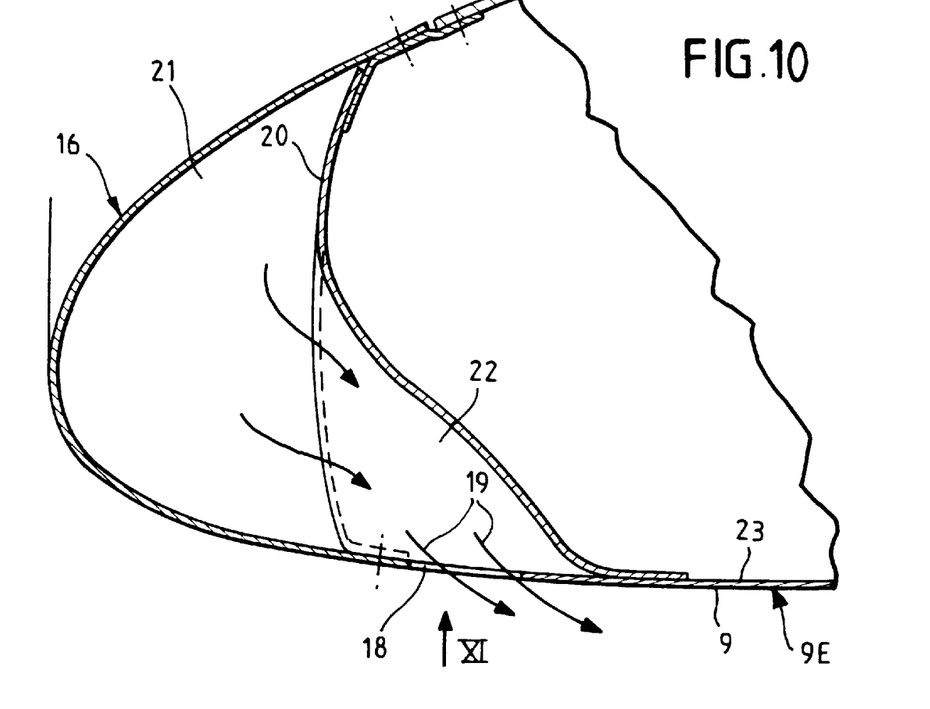
FIG. 10 is a diagrammatic and partial half section of the front part of an alternative form of the air inlet cowl in accordance with the present invention.
Figure 11:
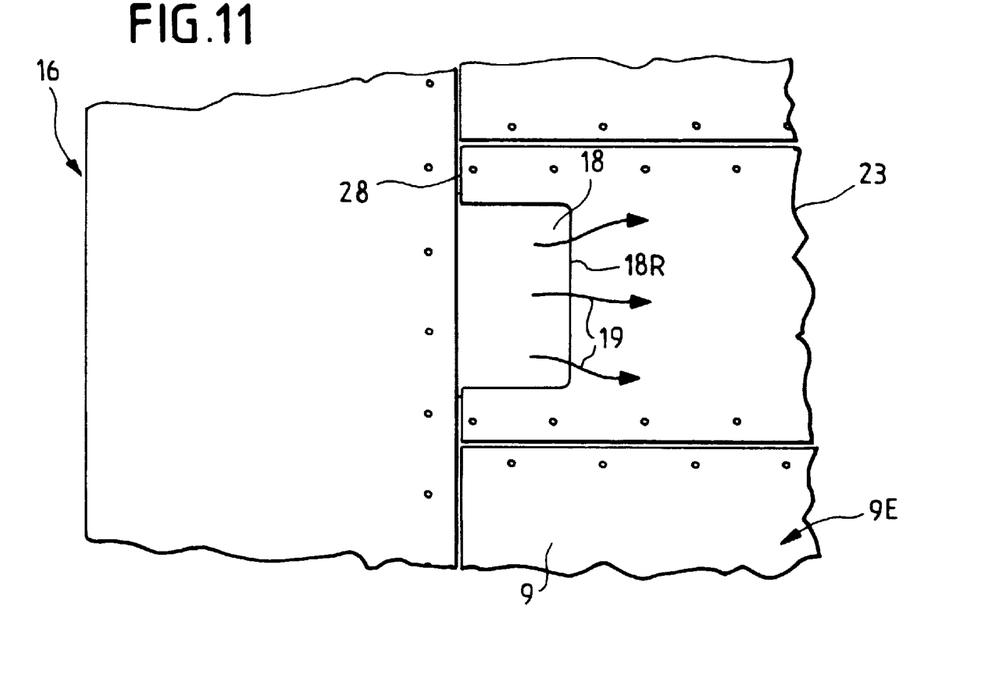
FIG. 11 is a partial view in the direction of arrow XI of FIG. 10.

In the embodiment of FIGS. 10 and 11 (the pipe 10 and the injector 12 not being depicted), the orifice 18 is in the form of a cutout made in the front free edge 28 of the part 23 placed at the leading edge 16 side, the strip 26 being omitted.

What is claimed is:

1. An air inlet cowl (9) for a jet engine for an aircraft, said air inlet cowl (9) being equipped with means for de-icing its leading edge (16) and comprising for this purpose:

a hollow leading edge (16) delimiting an internal peripheral chamber (21) which is closed by an internal partition (20), said internal partition (20) being equipped with a trough-shaped duct (22) directed toward a rear of said leading edge (16) and open toward the periphery of said air inlet cowl (9);

a pipe (10) which can be connected, at its rear end away from said leading edge (16), to a pressurized hot air circuit (14) and, at its front end toward said leading edge (16), to an injector (12) injecting pressurized hot air into said internal chamber (21); and a part (23) made of a material that can withstand high temperatures and forms part of an external surface (9E) of said cowl (9), to the rear of said leading edge (16), said part (23) closing off said trough-shaped duct (22) and being pierced in such a way as to place said internal chamber (21) in communication with the outside, wherein:

said part (23) comprises a single orifice (18) which has an oblong shape, has a front longitudinal edge (18F) and a rear longitudinal edge (18R), and is arranged parallel to said leading edge (16), said orifice serving to calibrate a jet of hot air ejected by said trough-shaped duct (22), while at the same time encouraging heat exchange between said jet of ejected hot air and the external ambient air and keeping this jet of hot air away from said cowl (9);

said part (23) extends in said external surface (9E) of said cowl (9) in a parallel direction to the length of said cowl at least substantially along the entire longitudinal length of said air inlet cowl (9) to protect all of this external surface that may be subjected to an action of the flow of hot air ejected by said single orifice (18).

2. The air inlet cowl (9) claimed in claim 1, wherein the rear longitudinal edge (18R) of said single oblong orifice (18) is concave, to give said orifice a width which is greater mid-way along its length than it is at its ends.

3. The air inlet cowl (9) claimed in claim 2, wherein the front longitudinal edge (18F) of said single oblong orifice (18) is straight and parallel to said leading edge (16), while said concave rear longitudinal edge (18R) of said orifice is curved.

4. The air inlet cowl (9) claimed in claim 1, wherein said single oblong orifice (18) comprises turbulence generators (29).

5. The air inlet cowl (9) claimed in claim 4, wherein said turbulence generators (29) are borne by at least one of the front or rear longitudinal edges (18F, 18R) of said single oblong orifice (18).

6. The air inlet cowl (9) claimed in claim 5, wherein said turbulence generators (29) are borne by the rear edge (18R) of said single oblong orifice (18) and at least those of said turbulence generators (29) which are situated near the ends of said orifice (18) turn the lateral parts of said jet of ejected hot air toward the center of said part (23).

7. The air inlet cowl (9) claimed in claim 1, wherein said part (23) is a door for inspecting said pipe (10).

8. The air inlet cowl (9) claimed in claim 1, wherein said trough-shaped duct (22) is peripherally close to said pipe (10).

9. The air inlet cowl (9) claimed in claim 1, wherein said trough-shaped duct (22) widens toward the periphery of said air inlet cowl (9).

10. The air inlet cowl (9) claimed in claim 1, wherein said trough-shaped duct (22) forms an integral part of said internal partition (20).

11. The air inlet cowl (9) claimed in claim 1, wherein said trough-shaped duct (22) consists of a part attached to said internal partition (20).

* * * * *

UNITED STATES PATENT AND TRADEMARK OFFICE
CERTIFICATE OF CORRECTION

PATENT NO. : 6,131,855
DATED : Oct. 17, 2000
INVENTOR(S) : Alain Porte

It is certified that error appears in the above-identified patent and that said Letters Patent is hereby corrected as shown below:

On the title page, [73], in the section marked "Assignee:", please delete "Societe Nationale Industrielle et Aerospatiale, Paris, France" and insert therefor -- Aerospatiale Societe Nationale Industrielle, Paris, France --.

Signed and Sealed this

Eighth Day of May, 2001

Attest:

NICHOLAS P. GODICI

Attesting Officer

Acting Director of the United States Patent and Trademark Office